Patented Oct. 4, 1938

2,132,349

UNITED STATES PATENT OFFICE 2,132,349

TREATMENT OF PHOSPHORIC ACID TO REMOVE FLUORINE

Charles F. Booth, Anniston, Ala., assignor, by mesne assignments, to Monsanto Chemical Company, a corporation of Delaware No Drawing. Application January 2, 1937, Serial No. 118,919

7 Claims. (Cl. 23—165)

This invention relates to the treatment of phosphoric acid and particularly to a treatment having as its object the removal of fluorine compounds therefrom. This application is a continuation in part of my earlier application, Serial No. 83,449, which was filed on June 4, 1936.

The object of this invention is the provision of a process for the removal of fluorine or compounds thereof from phosphoric acid.

It has previously been proposed to remove fluorine by means of certain salts particularly sodium silicate or by the use of various forms of hydrated silica. These methods were strictly precipitation methods and are in general limited as to their effectiveness by the solubility of the fluorine compound which is to be precipitated thereby. Such methods are objectionable mainly because of the difficulty of lowering the fluorine content of strong phosphoric acid to below 200 parts per million and are also objectionable because of the addition to the acid of alkaline materials.

I have now found that if I contact phosphoric acid, having a strength of between 50% and 90% $H_3PO_4$, with a granular adsorptive material, having the property of adsorbing water and substantially inert with respect to said acid, I am enabled to remove the fluorine or fluorine compounds from said acid down to a very low value. By employing my process it is possible to lower the fluorine content from an original value of say 300 to 500 p. p. m. in 75% $H_3PO_4$ to as low as 4 to 5 p. p. m. and even lower. It will accordingly be seen that by employing the surface forces characteristic of adsorption, a removal of over 99 per cent of the fluorine present can be readily effected. This is to be compared with a removal of 50 to 60 per cent of the fluorine when employing the known precipitation processes.

The strength of the acid which may be defluorinated by my herein disclosed process may as has already been indicated, be of any strength between the limits of 50% to 90% $H_3PO_4$. It is however necessary to point out that when once the adsorption agent or a part thereof has been saturated with fluorine or compounds thereof from an acid of a certain strength, the $H_3PO_4$ concentration of succeeding portions of acid should not be lowered. Should said concentration be lowered by design or otherwise, it will be found that fluorine has left the saturated adsorbing agent and entered the acid.

On the other hand if the adsorbing agent has once been saturated with fluorine by contact with an acid of a certain fluorine content, it will be found that said adsorbing agent may be contacted with an acid of higher $H_3PO_4$ content containing say approximately the same fluorine level and additional fluorine transferred to said adsorption agent.

It will thus be apparent that in the defluorination of phosphoric acid by the herein described process, after an equilibrium has once been established between the contact agent and an acid of a certain concentration at a definite fluorine level any decrease in the acid strength will cause the equilibrium to shift in the direction of a greater amount of fluorine in said acid. In other words, it appears from a theoretical standpoint as though an increase in the concentration of water in the phosphoric acid results in an increase in the amount of water adsorbed upon the adsorbing agent which increase in adsorbed water results in a decrease of adsorbed fluorine.

Adsorptive agents capable of use in my process may be prepared and used in a variety of ways, the following methods being given as examples thereof:

I may choose as the starting material a mineral capable of yielding upon acid leaching a residue of silica. Minerals such as Serpentine, Crysocolla and Greensand are treated with a mineral acid until the soluble salts have been substantially all removed. As a specific example, I crush down a quantity of Serpentine such as "Verd Antique" to rice size. I then leach the mineral with a hot dilute mineral acid, for example 6N sulfuric acid. When the acid has become saturated with magnesium salts it is discarded and replaced with fresh acid. This operation is repeated until the acid soluble residue consisting in this case of magnesium sulfate has been substantially completely removed, whereupon the silica skeleton is washed free of sulfuric acid. The silica skeleton is now ready for use.

Other mineral silicates such as those mentioned above may be similarly treated and a siliceous residue obtained, which may then be employed as an adsorbent for the removal of fluorine from phosphoric acid. Some mineral silicates yield lamilar or flake-like grains and accordingly I include such grains in the term granular.

For use in the purification of phosphoric acid the skeleton as above prepared is supported upon a gravel bed in a layer which may be from 6 inches to 6 feet deep. Phosphoric acid containing fluorine or its compounds is contacted with the skeleton for example, by causing it to flow upwardly through the skeleton bed. The depth of the skeleton bed and the rate of flow are variables which depend upon each other. In general, the greater the rate of flow of the acid the thicker the bed should be. In operating my process I make a trial experiment in which acid is run through at a constant rate and the fluorine content of the acid determined. The rate of flow may then be varied to yield a fluorine content such as desired.

By employing my herein described process I am able to remove the fluorine from phosphoric acid from an original value of 300 to 500 p. p. m. down to 4 to 5 p. p. m. or lower.

Substantial reductions in the fluorine content may be obtained by simply stirring the skeleton with phosphoric acid. Successive portions of skeleton may be added to the acid preferably with stirring and the skeleton removed by filtration or otherwise before the next portion is added. In this manner substantially all of the fluorine may be removed from the acid. The skeleton after removal from the acid may be reactivated by washing with water. I employ generally an amount of adsorbent material, say silica skeleton, in much greater quantity than the chemical equivalent of the fluorine present in the phosphoric acid. The amount of silica employed is at least ten times that theoretically required to form the chemical reaction products to be expected from the reaction.

I have found that other forms of silica may be employed to remove fluorine from phosphoric acid provided such forms possess an extended surface, i. e., are adsorbents. As an example of other forms of silica I may employ silica gel preferably the harder variety as I have observed some tendency of the softer grades to swell due to the action of the phosphoric acid.

Other adsorbents which may be used are hydrated stannic acid, hydrated titanium dioxide or hydrated vanadic acid. These substances may be employed as adsorbents by adding the appropriate salt to the phosphoric acid from which fluorine is to be removed, the adsorbent being added in quantity considerably greater than that indicated by the combining proportions to form a reaction product.

In like manner I may employ adsorbents prepared from organic salts. By adding either sodium benzoate, aluminum resinate, aluminum stearate, sodium or other stearic acid salts, it is possible to form in the phosphoric acid the corresponding acid. For example, sodium benzoate added to phosphoric acid yields an active adsorbent form of benzoic acid, aluminum resinate yields an active form of abietic acid, the stearates yield active forms of stearic acid. Such acids have the property of adsorbing considerable quantities of fluorine or fluorine compounds from phosphoric acid, and hence the employment of such adsorptive agents in the present process will yield a phosphoric acid of the desired low fluorine content. In place of employing phosphoric acid in the formative step, other acids may be employed and the active organc acid then transferred to the phosphoric acid for use.

In general I have found that solid acidic oxides and solid acids both solids being of porous nature and inert with respect to phosphoric may be employed as adsorbents for fluorine from phosphoric acid of the strength herein disclosed.

While in general I may employ any of the above non-siliceous adsorbents, I prefer as a practical matter to employ the siliceous type and particularly those bodies prepared by the acid leaching of silicate minerals. Such silica skeletons are reasonably strong, are cheap and have a good adsorptive capacity for fluorine and its compounds and can be revivified by washing out the adsorbed fluorine or its compounds with water.

For the practical carrying out of my process I provide a number of tanks of silica skeleton or other adsorptive agent and pass the acid to be treated through the said tanks in series. When the silica in the tank first in line has become saturated with fluorine, the acid is by-passed and introduced into the second tank in the original series, the first then being regenerated by washing with water or dilute acid. After regeneration the silica has again attained its maximum adsorptive capacity and is reintroduced into the series, becoming then the tank last in line from the standpoint of acid flow. By operating in this manner the adsorption agent in the tanks is most effectively used and the treated acid leaving the system reduced to a minimum fluorine content.

The particular degree of hydration of the silica employed appears not to be critical and I may accordingly employ an adsorptive form of silica which contains adsorbed water of both adsorbed and combined water.

The temperature at which defluornation of phosphoric acid may be carried out is usually that of ordinary room temperature, that is from 15 to 25° C. When using the stronger acids, say in the neighborhood of 90% strength, it is desirable to warm the acid somewhat in order to decrease the viscosity thereof. Acid temperatures may range from ordinary room temperatures as given above to as much as 45 to 55° C., or even higher.

The reactivation temperature, that is the temperature of the washing agent employed is preferably somewhat above room temperature that is it may be from 40 to 60° C., although if preferred lower temperatures may be employed. At the elevated temperatures a complete reactivation is more quickly attained.

Ordinarily I prefer to employ simple water washing in carrying out the reactivation step, however other reagents in aqueous solutions may be employed such as dilute acids or salts in solution which may then be followed by a washing with water.

In general it has been found that those adsorbents which have the property of adsorbing water either from the liquid or vapor phase also have the property of adsorbing fluorine from strong phosphoric acid solution.

Having now particularly described my invention and the manner in which it can be used, I desire that it be not limited except as required by the prior art or as particularly pointed out in the appended claims.

What I claim is:

1. A process for the substantially complete removal of fluorine from phosphoric acid containing the same, which comprises adsorbing fluorine from said acid by contacting said acid with an adsorbent hydrated skeletal material of the class consisting of silica, titanium dioxide, vanadic acid and stannic acid, the amount of adsorbent being greatly in excess of its combining proportion with the fluorine present.

2. A process for the substantially complete removal of fluorine from phosphoric acid containing the same, which comprises adsorbing fluorine from said acid by contacting said acid with an adsorbent hydrated skeletal material of the class consisting of silica, titanium dioxide, vanadic acid and stannic acid, the amount of adsorbent being greatly in excess of its combining proportion with the fluorine present, and then regenerating the adsorbent by contacting with an aqueous solution of lower phosphoric acid content than the acid previously employed.

3. The process as set forth in claim 2 in which the regenerating solution is substantially pure water.

4. A process for the substantially complete removal of fluorine compounds from phosphoric acid containing such compounds which comprises contacting said acid with an adsorptive skeletal form of silica obtained by the acid leaching of silicate minerals.

5. A process for the substantially complete removal of fluorine compounds from phosphoric acid containing such compounds which comprises contacting said acid with an adsorptive skeletal form of silica obtained by the acid leaching of serpentine.

6. The process of removing fluorine or compounds thereof from fluorine containing phosphoric acid having a strength ranging between 50% and 90% $H_3PO_4$ content, which comprises contacting said acid with a siliceous skeleton in granular form prepared by the acid leaching of mineral serpentine, and thereby adsorbing said fluorine or compounds thereof upon said siliceous skeleton.

7. The process of removing fluorine or compounds thereof from fluorine containing phosphoric acid having a strength ranging between 50% and 90% $H_3PO_4$ content, which comprises contacting said acid with a siliceous skeleton in granular form prepared by acid leaching of "Verd Antique" and thereby adsorbing said fluorine or compounds thereof upon said siliceous skeleton.

CHARLES F. BOOTH.